United States Patent [19]

Thornton et al.

[11] 4,389,355

[45] Jun. 21, 1983

[54] SINTERING $UO_2$ AND OXIDATION OF $UO_2$ WITH MICROWAVE RADIATION

[75] Inventors: Thomas A. Thornton; Veldon D. Holaday, Jr., both of Lynchburg, Va.

[73] Assignee: The Babcock & Wilcox Company, New Orleans, La.

[21] Appl. No.: 286,403

[22] Filed: Jul. 23, 1981

[51] Int. Cl.³ .............................................. G21C 21/00
[52] U.S. Cl. ..................................... 264/0.5; 252/643; 423/260; 423/261
[58] Field of Search ................. 252/627, 643; 264/0.5; 423/260, 261

[56] References Cited

U.S. PATENT DOCUMENTS

| | | | |
|---|---|---|---|
| 3,927,154 | 12/1975 | Carter | 264/0.5 |
| 4,256,676 | 3/1981 | Kovach | 264/0.5 |
| 4,297,305 | 10/1981 | Lee et al. | 264/0.5 |

FOREIGN PATENT DOCUMENTS

| | | | |
|---|---|---|---|
| 888105 | 12/1971 | Canada | 264/0.5 |
| 1320266 | 6/1973 | United Kingdom | 264/0.5 |

*Primary Examiner*—Leland A. Sebastian
*Attorney, Agent, or Firm*—Robert J. Edwards; John L. LaPierre

[57] ABSTRACT

An improved method for preparing nuclear fuel pellets and recycling uranium dioxide utilizing microwave radiation wherein microwave induction furnaces replace conventional refractory-type sintering and shaker-air furnaces.

15 Claims, No Drawings

SINTERING $UO_2$ AND OXIDATION OF $UO_2$ WITH MICROWAVE RADIATION

BACKGROUND OF THE INVENTION

The present invention relates to an improved method for preparing nuclear fuel pellets and recycling uranium dioxide and, more particularly, to the processing and recycling of uranium dioxide by utilizing microwave radiation in microwave induction furnaces.

Uranium dioxide ($UO_2$) is the fuel most commonly used in present day nuclear power reactors with the $UO_2$ generally taking the form of sintered pellets which are loaded into and sealed in slender, hollow metal tubes called fuel rods. It is a plurality of such fuel rods that establishes an accumulation of fissionable material in sufficient concentration to support sustained fission reactions within the core of a nuclear reactor.

A number of techniques have been developed for manufacturing nuclear fuel pellets the most common of which is the cold pressing of powdered $UO_2$ into pellets which are sintered in hydrogen in a refractory-type furnace at temperatures of about 1700° C. for approximately three to six hours. Typically, after pressing, the formed pellets are placed in highly heat-resistant transport containers called transport boats which are pushed or walked through a resistance-heated sintering furnace lined with highly refractory blocks wherein the pellets are sintered to form dense, stable end products. Such processing, however, necessitates a special electrically-heated furnace which is expensive to operate and maintain and the temperature range of such "pusher" and "walking-beam" type furnaces seems to be at or about the limit of commercial technology. Additionally, such furnaces have not shown themselves to be amenable to the type of remote operation required for the reprocessing and refabrication of nuclear fuels.

During the nuclear fuel pellet preparation process, there is generated a quantity of rejected sintered $UO_2$ pellets and scrap $UO_2$ powder available for recycling. A typical prior art method of $UO_2$ recovery for recycling is the heating of the material in air so that $UO_2$ converts to $U_3O_8$ and as $U_3O_8$ the material is available for recycling or blending back with clean $UO_2$ and organic binder powders at the initial phase of the nuclear fuel pellet preparation process. $U_3O_8$ has a different crystal structure than $UO_2$ and when it is formed from $UO_2$ the structural difference causes the initial structure to spall and fragment. Prior art conversion of $UO_2$ to $U_3O_8$ for recycling is commonly done in a conventional air furnace and, as the material is heated, it is shaken to aid in fracturing.

The objects of the present invention are to replace the refractory-type resistance-heated sintering furnace used in the nuclear fuel pellet preparation process and the shaker-air furnace combination used in the $UO_2$ to $U_3O_8$ conversion-recycling process with microwave induction furnaces. Heretofore, microwave induction has been used as a heating mechanism almost entirely via the susceptance of the water molecule to microwave radiation, that is, the use of microwaves for heating of materials has been centered on the effects that microwaves have on water molecules. Microwaves cause rapid changes in the polarization of the water molecule and thereby generate heat. The invention herein described discloses that uranium oxide with stoichiometries $UO_2$ through $U_3O_8$ and that sintered $UO_2$ pellets and scrap $UO_2$ powder directly suscept to microwave radiation. Accordingly, the refractory-type sintering furnace and the air furnace above discussed can be replaced by much smaller microwave induction furnaces.

The present invention overcomes many of the fuel processing shortcomings of the prior art refractory-type sintering furnace by decreasing sintering times, allowing quicker attainment of temperatures, producing higher available temperatures, decreasing energy consumption and space requirements, reducing wear on or eliminating the need for refractory furnace materials, readily adapting to modularized operation in remote locations wherein loss of or damage to one module would not shut down the entire operation and resulting in improved densification and porosity characteristics of the sintered product. Additionally, the invention overcomes many of the recycling deficiencies associated with the shaker-air furnace combination by shortening the heat-up time for raising $UO_2$ to its oxidation temperature, allowing static fragmentation of sintered $UO_2$ pellets and more efficiently producing a $U_3O_8$ powder for blend-back.

SUMMARY OF THE INVENTION

The present invention relates to an improved method for preparing nuclear fuel pellets and recycling uranium dioxide utilizing the concept of microwave radiation in a microwave induction furnace. Typically, during the pellet preparation process, uranium dioxide and organic binder powders are blended then shaped and pressed into pressed pellet compacts. The pressed compacts are then heated, sintered and held at the sintering temperature in a microwave induction furnace in a reducing atmosphere, after which, the sintered compacts are cooled to room temperature under continued reducing atmospheric conditions. After cooling, the compacts are ground to the desired finished uranium dioxide pellet product. A quantity of scrap uranium dioxide powder and rejected sintered uranium dioxide pellets generated during pellet preparation is available for recycle to a microwave induction furnace wherein the material is heated in an oxidizing atmosphere. In the furnace, the recycled uranium dioxide is oxidized to a $U_3O_8$ powder and then conveyed for blending with uranium dioxide and organic binder powders at the beginning step of the nuclear fuel pellet preparation process.

The various features of novelty which characterize the invention are pointed out with particularity in the claims annexed to and forming a part of this disclosure. For a better understanding of the invention, its operating advantages and specific results obtained by its use, reference should be made to the accompanying descriptive matter in which there is illustrated and described a typical embodiment of the invention.

DETAILED DESCRIPTION OF THE PREFERRED EMBODIMENT

Nuclear fuel pellets manufactured to fuel nuclear reactors are produced by starting with a uranium dioxide ($UO_2$) powder (industry has adopted $UO_2$ although the stoichiometric starting powder can be represented as $UO_{2.05-2.15}$) and blending it with a commercially available organic binder powder. The quantity of organic binder is not crucial but it should be in the range of about 0.1 to 0.3% by weight of the blended mixture, the remainder being about 99.7 to 99.9% $UO_2$, an amount sufficient to hold the powders together during shaping and pressing. Blending time should be sufficient to produce a homogenous mixture. After blending, the blended mixture is shaped and cold pressed into pressed green pellet compacts, the pressing force being that sufficient to compact the powders to approximately 50% of their theoretical mixture density, a determination based upon compact length, diameter and weight. The compacts are then heated and sintered in a microwave induction furnace in a reducing atmosphere consisting essentially of a nitrogen ($N_2$) and hydrogen ($H_2$) gas mixture and, more specifically, about a 75% $H_2$-25% $N_2$ gas mixture. However, any reducing atmosphere would be operable. The sintering temperature is in the range of about 1600° C. to 1800° C., and the compacts are held in the microwave furnace in the reducing atmosphere at the sintering temperature for approximately 2 to 6 hours to achieve a compact density of about 95% of theoretical density. Sintering in a reducing atmosphere reduces the hyperstoichiometric starting powder, $UO_{2.05-2.15}$, to $UO_2$. After sintering, the compacts are cooled to approximately room temperature, the cooling being conducted in the reducing atmosphere. After cooling, the compacts are ground to the desired $UO_2$ finished pellet product.

The nuclear pellet fabrication process above described can also be conducted with additional process steps included after the shaping and pressing step but before the sintering step. However, with the additional steps, the above mentioned pressing force becomes that sufficient to compact the powders to approximately 44% of their theoretical mixture density. The additional steps include forcing the compacts through screens to form a granulate and then cold pressing the granulate into pressed pellet compacts, the granulate pressing force being that sufficient to compact the granulate to approximately 50% of theoretical density. Additionally, $U_3O_8$ powder can be blended with the $UO_2$ and organic binder powders in the first step of the fuel preparation process, the $U_3O_8$ powder being approximately 5% by weight of the blended mixture, the remainder being about 0.1 to 0.3% binder and about 94.7 to 94.9% $UO_2$. The $U_3O_8$ constituent of the pellet compacts, upon sintering in the reducing atmosphere, is converted to $UO_2$.

It has been determined that uranium oxide with stoichiometries $UO_2$ through $U_3O_8$ directly suscepts to microwave radiation at approximately 2450 MHz, the frequency of the standard kitchen-type microwave oven, heating rapidly to very high, red-hot temperatures. It should be understood that, while a conventional microwave oven was selected for use because of its ready availability, other microwave induction furnaces, conventional and non-conventional, operating at different frequencies would also be operable. Other ceramic materials including alumina, silica, niobia, lithia and graphite do not as readily suscept to microwave radiation at 2450 MHz.

Testing to ascertain that uranium oxide with stoichiometries $UO_2$ through $U_3O_8$ directly suscepts to microwave radiation was conducted by placing green pressed $UO_2$ pellet compacts into an alumina tube, placing the tube into a conventional 2450 MHz microwave oven, providing a means for introducing a reducing atmosphere into the tube, plugging the ends of the tube with refractory insulating material, and heating the tube, with compacts, in the oven in a reducing atmosphere of a $N_2$ and $H_2$ gas mixture. Heating was initially conducted for two minutes at a power setting of 20, which means that 100% of the oven power was delivered 20% of the time. The initial power of 20, sufficient to remove most of any contained moisture, was increased to a power setting of 30 and held for five minutes to remove any remaining moisture. The power was then raised to a setting of 70 for ten minutes and then increased to a 100 setting for fifteen additional minutes. The alumina tube itself was transparent to the microwave radiation allowing for passage of the microwave radiation and heating of the compacts from the inside out rather than from the outside in, a characteristic of normal refractory furnaces. Heating to 1370° C. was achieved after only fifteen minutes of operation. A flickering glow from within the tube began about five minutes into the 70 power setting with the glow becoming constant at the full power setting of 100, a sintering temperature of 1620° C. was measured at the outer surface of the tube. The power setting of 100 was held for an additional fifteen minutes and then the compacts were cooled in the oven to about room temperature, the reducing atmosphere being continuously maintained. Compact density measurements were made and are presented as follows:

| COMPACT (#) | DIAMETER (cm) | LENGTH (cm) | WEIGHT (g) | DENSITY (g/cc) | THEORETICAL DENSITY (%) |
|---|---|---|---|---|---|
| 1 unsintered (control) | .70 | 1.04 | 2.24 | 5.59 | 51.00 |
| 2 sintered | .59 | .85 | 2.12 | 9.12 | 83.21 |
| 3 sintered | .58 | .73 | 1.72 | 8.91 | 81.30 |
| 4 sintered | .59 | .87 | 2.01 | 8.45 | 77.10 |

Additional testing was conducted on $UO_2$ pellet compacts of the size most commonly encountered in nuclear fuel pellet preparation. The testing was conducted as described above except that the sintering time was increased to four hours and the compacts had an inside diameter of approximately 0.3 cm. Compact density measurements were made and are presented as follows:

| COMPACT (# | OUTSIDE DIAMETER (cm) | LENGTH (cm) | WEIGHT (g) | DENSITY (g/cc) | THEORETICAL DENSITY (%) |
|---|---|---|---|---|---|
| 1 | .97 | 1.05 | 7.12 | 10.14 | 92.54 |
| 2 | .97 | 1.11 | 7.87 | 10.52 | 96.02 |
| 3 | .98 | 1.11 | 7.85 | 10.43 | 95.14 |
| 4 | .98 | 1.04 | 7.02 | 9.93 | 90.57 |
| 5 | .97 | 1.04 | 7.01 | 10.07 | 91.92 |
| 6 | .98 | 1.08 | 7.66 | 10.41 | 94.98 |
| 7 | .98 | 1.10 | 7.76 | 10.43 | 95.19 |
| 8 | .97 | 1.17 | 7.79 | 9.92 | 90.48 |
| 9 | .98 | 1.14 | 7.71 | 9.86 | 89.95 |
| 10 | .97 | 1.11 | 7.61 | 10.41 | 95.01 |

Alumina was selected for use in the sintering chamber because it could withstand the high temperatures generated but not interact with the microwave field. Metallic components could therefore not be considered since they reflect microwaves. During the nuclear fuel preparation process, the compacts need not be sealed in alumina tubes, but, alumina boats, vessels or other material invisible to microwave radiation, could be used as the carrying means for the compacts in the microwave induction furnace. Test compacts of uranium dioxide with organic binder, and, uranium dioxide and $U_3O_8$ with organic binder, all suscepted to microwave radiation thus demonstrating the microwave induction sintering furnace to be a viable alternative to the refractory-type sintering furnace.

Recycling of scrap uranium dioxide is an important adjunct to the nuclear fuel preparation process. During pellet preparation, there is generated a quantity of sintered uranium dioxide pellets and uranium dioxide powder available for recycle. Sintered pellets that do not meet specifications and uranium dioxide powder or grinder sludge generated during the compact grinding step are conveyed, in an alumina boat, vessel or comparable material invisible to microwave radiation, to a microwave induction furnace for reprocessing and recycling. Additionally, any other scrap uranium dioxide could be added and processed in this manner. Heating of the material to its oxidation temperature of at least 200° C. in the microwave furnace is accomplished by microwave radiation in an oxidizing atmosphere, generally, but not limited to, air, wherein $UO_2$ is oxidized to a $U_3O_8$ powder. Specific heating time and temperature are not critical but heating should be conducted for a time sufficient to change the material to a fine black powder, a process that is a function of material mass but is generally accomplished in an approximate temperature range of 400° to 500° C. in approximately 20 to 40 minutes. In the furnace, the pellets are heated to the point where the outer pellet surface oxidizes to $U_3O_8$ and separates from the $UO_2$ inner pellet due to the differences in density between $UO_2$ and $U_3O_8$, the $UO_2$ being of greater density. With the introduction of fresh, unoxidized surfaces, the process would continue until the entire pellet was oxidized to a black $U_3O_8$ powder. The uranium dioxide powder or grinder sludge is already in powder form, therefore, upon heating in the furnace in the oxidizing atmosphere, the sludge would quickly be converted to the $U_3O_8$ powder. The oxidized product leaving the furnace is a fine $U_3O_8$ powder suitable, after cooling, for blending back with uranium dioxide and organic binder powders in a nuclear fuel pellet preparation process.

Heating in the recycling furnace can be continuous or intermittent. Pellet oxidation, however, is enhanced by microwave heating when the power level is alternated, a power on followed by a power off cycle. After a period of power on followed by a period of power off, the $UO_2$ pellets heat up extremely rapidly when the microwave radiation is restored. Sintered pellets have been completely fragmented by simply turning the microwave source off and on while the pellets are oxidizing. When the $UO_2$ material has surpassed the oxidation temperature, its susceptance to microwave radiation is very high. When the microwave radiation is interrupted, the material begins to cool, still oxidizing. The material immediately returns to a glowing red temperature when the microwave radiation is reintroduced. The rapid heat-up and cool-down causes tremendous thermal stresses to exist in the pellet structure. The thermal stresses, along with the stresses introduced due to the difference in density between $UO_2$ and $U_3O_8$, cause pellet fracture in a static condition. Fresh surfaces are exposed upon every cooling cycle allowing oxidation to continue to completion.

Laboratory testing has established that samples of $UO_2$ powder placed in a conventional 2450 MHz microwave oven directly suscept to microwave radiation in an oxidizing atmosphere. A $UO_2$ powder sample weighing approximately 5 grams will be glowing red in less than one minute and oxidation will be occurring at all surfaces in contact with air. Testing has also shown that a sintered pellet placed in the microwave field suscepts within approximately 1 to 2 minutes with the pellet breaking up as oxidation progresses. Oxidation of the pellet is enhanced by setting the power level to a power setting of 50. The pellet fractures due to density differences and induced thermal stresses as the microwaves are turned on and are then shut off. A reduced power setting, providing on/off or intermittent microwave radiation, enhanced the oxidation by setting up thermal stresses and density differences causing pellet fracture and increasing the fresh $UO_2$ surfaces available for oxidation.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without corresponding use of the other features.

We claim:

1. A method for preparing nuclear fuel pellets comprising the steps of:
   (a) blending a predetermined quantity of uranium dioxide and organic binder powders;
   (b) shaping and pressing the blended mixture into pressed pellet compacts;
   (c) heating and sintering the compacts in a microwave induction furnace in a reducing atmosphere;
   (d) holding the compacts at the sintering temperature in the reducing atmosphere for a predetermined time;
   (e) cooling the compacts to approximately room temperature while maintaining the reducing atmosphere; and
   (f) grinding the compacts to the desired finished pellet product.

2. The method according to claim 1 wherein the pressing is sufficient to achieve a theoretical compact density of approximately 50%.

3. The method according to claim 1 wherein the pressing is sufficient to achieve a theoretical compact density of approximately 44%.

4. The method according to claim 1 further including between steps (b) and (c) the steps of:
   forcing the compacts through screens to form a granulate; and
   pressing the granulate into pressed pellet compacts.

5. The method according to claim 4 wherein the pressing is sufficient to achieve a theoretical compact density of approximately 50%.

6. The method according to claim 1 wherein the compacts are sintered in said microwave induction furnace at a temperature in the range of about 1600° C. to about 1800° C.

7. The method according to claim 1 wherein said reducing atmosphere comprises a $N_2$ and $H_2$ gas mixture.

8. The method according to claim 7 wherein said gas mixture is about 75% $H_2$ and 25% $N_2$.

9. The method according to claim 1 wherein said quantity of uranium dioxide and organic binder powders of step (a) is approximately 99.7 to 99.9% and 0.1 to 0.3% by weight respectively.

10. The method according to claim 1 wherein the holding time of step (d) is from approximately 2 to 6 hours.

11. The method according to claim 1 further including the step of adding a predetermined quantity of $U_3O_8$ powder for blending with said uranium dioxide and organic binder powders of step (a).

12. The method according to claim 11 wherein the quantity of $U_3O_8$ powder is approximately 5% by weight of the blended powder mixture.

13. A method of recycling rejected sintered uranium dioxide pellets and scrap uranium dioxide powder generated during the preparation of nuclear fuel pellets comprising the steps of:

conveying sintered uranium dioxide pellets, scrap uranium dioxide powder or the combination thereof to a microwave induction furnace;

heating the conveyed material in the microwave induction furnace in an oxidizing atmosphere to oxidize the uranium dioxide to $U_3O_8$ powder; and transferring the $U_3O_8$ powder for blending with uranium dioxide and organic binder powders in a nuclear fuel pellet preparation process.

14. The method according to claim 13 wherein heating in the microwave induction furnace is continuous.

15. The method according to claim 13 wherein heating in the microwave induction furnace is intermittent.

* * * * *